United States Patent
Nordin et al.

(10) Patent No.: US 10,131,415 B2
(45) Date of Patent: Nov. 20, 2018

(54) AIRFRAME LEADING EDGE

(71) Applicant: SAAB AB, Linköping (SE)

(72) Inventors: Pontus Nordin, Linköping (SE); Göte Strindberg, Linköping (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 14/646,028

(22) PCT Filed: Nov. 20, 2012

(86) PCT No.: PCT/SE2012/051280
§ 371 (c)(1),
(2) Date: May 20, 2015

(87) PCT Pub. No.: WO2014/081356
PCT Pub. Date: May 30, 2014

(65) Prior Publication Data
US 2015/0298787 A1    Oct. 22, 2015

(51) Int. Cl.
*B64C 1/06*   (2006.01)
*B64C 3/28*   (2006.01)
(Continued)

(52) U.S. Cl.
CPC ............ *B64C 1/062* (2013.01); *B64C 1/12* (2013.01); *B64C 3/28* (2013.01); *B64D 2045/0095* (2013.01)

(58) Field of Classification Search
CPC .............. B64C 1/062; B64C 1/12; B64C 3/28
See application file for complete search history.

(56) References Cited

U.S. PATENT DOCUMENTS 3,910,531 A  * 10/1975  Leomand .............. B64C 1/065
                                                 244/119
4,507,011 A  *  3/1985  Brown ................. B29C 65/562
                                                 156/304.3
(Continued)

FOREIGN PATENT DOCUMENTS

DE    102005060958 A1   6/2007
EP       1176089 A2     1/2002
(Continued)

OTHER PUBLICATIONS

PCT/ISA/210—International Search Report—dated Sep. 25, 2013 (Issued in Application No. PCT/SE2012/051280).
(Continued)

*Primary Examiner* — Brian M O'Hara
*Assistant Examiner* — Keith L Dixon
(74) *Attorney, Agent, or Firm* — Venable LLP; Jeffri A. Kaminski

(57) ABSTRACT

An airframe leading edge part designed to be replaceable fixed to a structural portion which during use moves through the air. The airframe leading edge part includes first and second longitudinal joint edges adapted to fit the structural portion. At least one joint is provided between the structural portion and at least one of the longitudinal joint edges. The joint is adapted to break in the event of a object strikes and deforms the airframe leading edge part during use. The joint is designed to break at beforehand determined maximum joint strength of the joint. Also a repair method for exchanging a damaged leading edge.

16 Claims, 7 Drawing Sheets

(51) Int. Cl.
  *B64C 1/12* (2006.01)
  *B64D 45/00* (2006.01)

(56) References Cited

U.S. PATENT DOCUMENTS

| | | | | |
|---|---|---|---|---|
| 4,556,592 | A * | 12/1985 | Bannink, Jr. | B29C 65/601 403/2 |
| 4,657,615 | A | 4/1987 | Braun et al. | |
| 5,908,522 | A | 6/1999 | Lofstrom et al. | |
| 6,616,101 | B2 * | 9/2003 | De Castro Nodal | B64C 3/20 244/123.3 |
| 7,357,353 | B2 * | 4/2008 | Stephens | B64C 3/18 244/123.1 |
| 7,871,041 | B2 * | 1/2011 | Brice | B64F 5/00 244/123.1 |
| 8,602,355 | B2 * | 12/2013 | McBroom | B64C 3/28 244/123.1 |
| 8,925,870 | B1 * | 1/2015 | Gordon | B64C 3/28 244/200 |
| 9,322,276 | B2 * | 4/2016 | Guinaldo Fernandez | B64C 3/28 |
| 2002/0011540 | A1 | 1/2002 | De Castro Nodal et al. | |
| 2009/0127392 | A1 * | 5/2009 | Gross | B32B 3/02 244/121 |
| 2010/0308170 | A1 * | 12/2010 | Hadley | B64C 1/12 244/131 |
| 2012/0132753 | A1 | 5/2012 | Caballero et al. | |

FOREIGN PATENT DOCUMENTS

| | | |
|---|---|---|
| EP | 2130762 A2 | 12/2009 |
| EP | 2457822 A1 | 5/2012 |
| GB | 2039526 A | 8/1980 |
| GB | 2477339 A | 8/2011 |
| WO | WO-2004/098993 A1 | 11/2004 |

OTHER PUBLICATIONS

PCT/ISA/237—Written Opinion of the International Searching Authority—dated Sep. 25, 2013 (Issued in Application No. PCT/SE2012/051280).

PCT/IPEA/409—International Preliminary Report on Patentability—dated Apr. 10, 2015 (Issued in Application No. PCT/SE2012/051280).

Office Action dated Sep. 9, 2016 in corresponding European Office Action No. 12 888 908.6.

Supplementary European Search Report dated Sep. 9, 2016 in corresponding European Application No. 12 888 908.6.

* cited by examiner

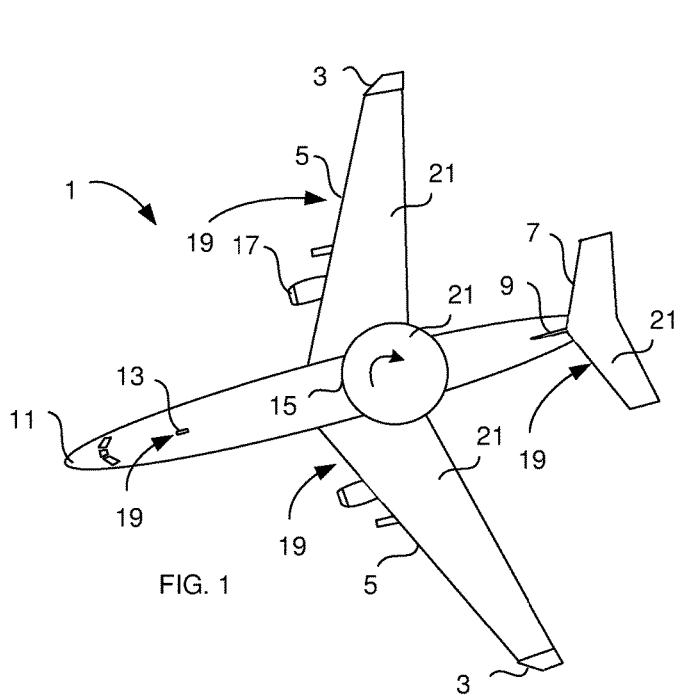
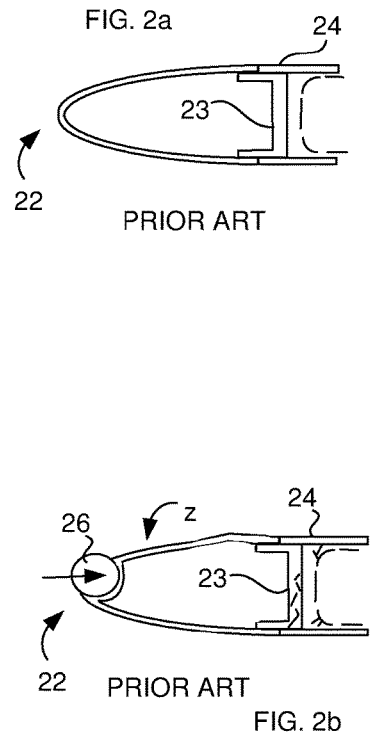
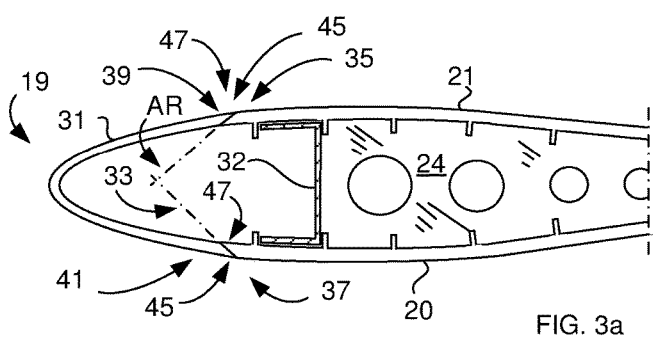
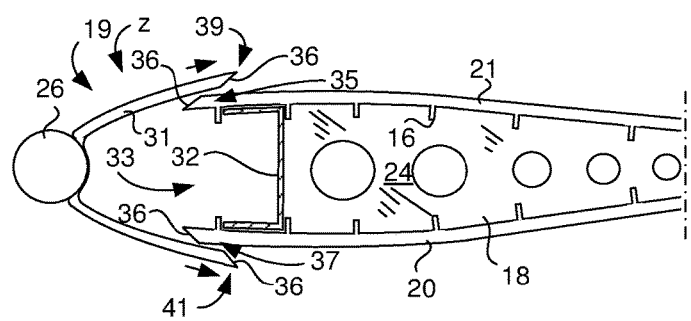

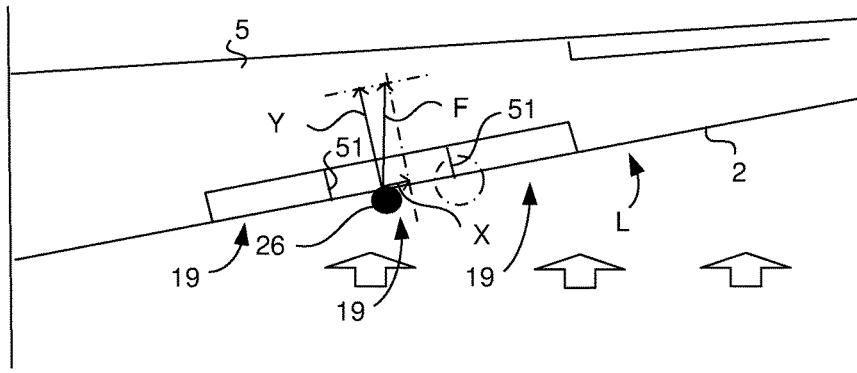
FIG. 8a
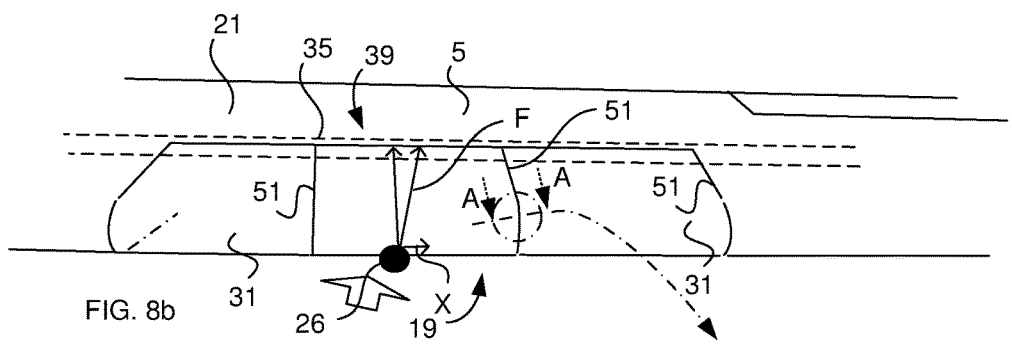
FIG. 8b
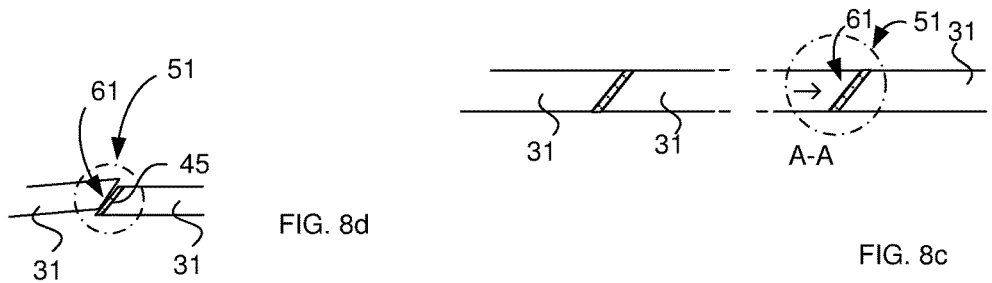
FIG. 8d
FIG. 8c
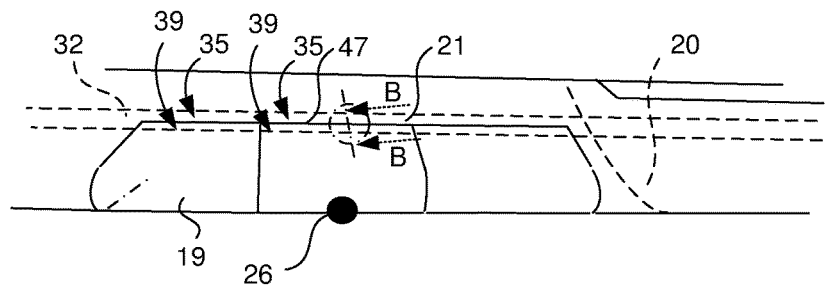
FIG. 8e
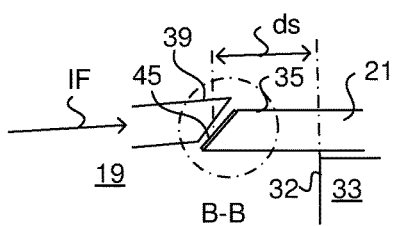
FIG. 8f

ABSTRACT

AIRFRAME LEADING EDGE

CROSS-REFERENCE TO RELATED APPLICATIONS

The application is the national phase under 35 U.S.C. § 371 of PCT/SE2012/051280 filed 20 Nov. 2012.

TECHNICAL FIELD

The present invention relates to an airframe leading edge and a method for repairing an airframe leading edge.

The invention relates to the aircraft industry and to aircraft service engineering. The invention is not limited thereto, but could also be related to activities of airline companies as well.

BACKGROUND ART

Wings (also fins, stabilizer, nacelles, nose cones etc.) of aircraft comprise airframe leading edges. The leading edge is often made as an one-piece member or multi-piece members, which can be designed to be removable or cut from the wing and exchanged with a new airframe leading edge bonded or bolted to the wing box structure. Such exchange is made if the aircraft has collided with a bird, or in case of ground accidents, wherein the air frame leading edge has been damaged or buckled. Heavy birds could also damage the structure of the wing/fin/stabilizer/nacelle/nose in event of collision. Such collisions may especially occur during takeoff and landing in bird-rich biotopes. In such case the risk of accident is high. The object impacting on the leading edge thus may cause large damage to the adjacent structure. Also flying through hailstorm could negatively affect the leading edge and airframe structure. Also accidental collisions against hangar ports and parked aircraft may occur and it is a desirable to protect the structural portion (wing skin spars, electronics with structural portion etc.) and at the same time in a cost- and time-effective way to exchange the damaged airframe leading edge to a new leading edge.

U.S. Pat. No. 4,657,615 discloses a composite article comprising a leading edge. The leading edge portion and a spar portion are connected together to form a one-piece member. The leading edge is bond to the spar portion by using an adhesive applied between a backside of the leading edge and the spar portion.

Furthermore, WO 2004/098993 discloses a wing having a structural part and a separable complementary leading edge part, which comprises an energy adsorption material core. The purpose of the leading edge in WO 2004/098993 is to provide a wing structure that is able to withstand a strike of a large bird or another object. This is solved by arranging a honeycomb material or foam that absorbs a high amount of energy and distributes the impact span-wise over the wing's leading edge. A backside of the leading edge part constitutes a sheet that forms the edge part to a beam for protection of the structural part. A recess is formed between the structural part's skin shell and the skin shell of the leading edge.

US 2009/0127392 discloses a leading edge having a skin which deforms into a void of the leading edge when a force acts on the skin so as to absorb the force without damaging the structure. The skin of the leading edge is bonded or glued firmly to the wing structure situated behind the leading edge seen in the direction of flight.

The object of the present invention is to develop and improve known technique.

Another object is to provide an airframe leading edge that prevents damage to the aircraft structure as a result of e.g. a bird strike.

Another object is to provide a replaceable airframe leading edge which is light in weight and which is easy to remove and replace.

Also is it an object to protect the structural portion of an aircraft during taxi and roll transports in hangars.

SUMMARY OF THE INVENTION

This has been achieved by the airframe leading edge being defined in the introduction.

In such way is achieved that a safe and cost-effective performance of the aircraft or other aerial structure moving through the air can be made. In the event of a bird strike on the airframe leading edge part, the bird impact generates a force, or forces, onto the airframe damaging the airframe leading edge part's skin if the loads of said force/forces are high enough and which force, or forces, further acting on the joint.

The joint preferably comprises adhesive. The joint's maximum joint strength is suitably determined in regard to the overlap length of the joint, the thickness of the skin of the airframe leading edge within the area of the longitudinal joint.

Suitably, a further joint being oriented in chordwise direction and is designed to break at a joint strength predetermined to be higher than said maximum joint strength.

In such way is achieved that the leading edge part primarily is break apart in the spanwise oriented joints (e.g. upper and lower) before said further chordwise joints break apart so that the intact chordwise oriented joints still permit the ribs of the wing box to take up loads from the leading edge part.

The joint alternatively comprises rich resin layer as adhesive.

The joint alternatively comprises electrically conductive adhesive.

The joint alternatively comprises electrically isolating adhesive.

A leading edge made of metal is preferably mounted to a wing box made in fibre reinforced composite plastic, such as CFRP (carbon fiber reinforced plastic).

The joint preferably being designed to tear apart due to peel and shear stresses generated by the impact and due to the fact that shear strains exceed the strength limits for the adhesive or resin rich joint.

The joint suitable comprises stress parameters such as tension/compression stress, peel stress etc., all determining the maximum joint strength of the joint. The joint may be designed to break apart due to built in failure of the adhesive or resin rich joint.

Preferably, when the joint being loaded due to the impact, the adhesive will be stressed beyond its yield point in shear and/or peel and the joint breaks apart.

The joint is preferably designed to break apart when the impact force is so high that, even though deformation of the airframe leading edge skin has occurred due to absorption of the impact energy, the maximum joint strength (Pmax) of the joint is reached span wise (and/or cord wise).

The longitudinal joint edges are suitably oriented with their extensions essentially parallel with the front spars extending in the prolongation of the wing. That is, for example being parallel with the extension of the structural portion. The edges could also be arranged parallel with the prolongation of the front spar of the wingbox. The leading edge cold be designed without or with one or several internal spar/spars. The joint edges (of both leading edge and wing box) are preferably arranged at a distance from the structural portion (such as front spar, ribs, all parts of which constituting the wing box), The joint edges (of both leading edge and wing box) are preferably arranged at a distance from the structural portion (such as front spars, wing spars, ribs, all parts of which constituting the wing box), wherein the skin of the wing box extends over the front spars and ends with said joint edge. The joint edge of the leading edge and the joint of the wing box define the joint.

The joint suitably is a butt joint or preferably a scarf joint (a scarf joint having two mating inclined faces) comprising overlapping contact areas. By the present solution is achieved that the structural portion will be protected in the event of bird impact or eventual taxi into hangar door or other aircraft. By the deformation zone of the airframe leading edge part skin and the beforehand and predetermined set strength stress set of the breakable joint, the airframe leading edge will take up and convert impact forces affecting the skin of the airframe leading edge instead of the structural portion, with a risk for damaging the latter. The impact energy will be transferred into the "breakaway" force, breaking away the airframe leading edge from the structural portion. This is cost-effective in view of service and the structural portion remains intact and its structural properties are not affected. The structural portion must not be built with larger amount of material for reinforcing the structural portion. This saves weights and fuel, which is important for aircraft. By providing at least one of the longitudinal (in span wise direction) joint edges with said determined maximum joint strength (Pmax) and the other chordwise arranged joints with a higher strength for firm bonding, the airframe leading edge (in case of bird impact) will maintain its position in front of the structural portion, wherein it is adapted to resilient spring back to original position, thereby not affecting the air stream in an unacceptable way.

Suitably, the joint is a scarf joint.

In such way is achieved that the ratio between the overlap of the joint and the thickness of the airframe leading edge skin within the area of the longitudinal joint edge can be determined for reaching a desired maximum joint strength of the joint in addition to determine the breakable properties of the adhesive of the joint material or resin rich joint material. The acute point of the joint edge of the leading edge skin coincides with the outer surface of the wing skin and the obtuse point of the joint edge of the leading edge skin is positioned in front of said acute point seen in a direction of flight.

Preferably, the joint is a butt joint or at least comprises a butt joint surface (contact area or face). Suitably, the joint is a butt joint comprising a joint plate (butt strap) and/or is a joint extending in chordwise direction.

Thereby it will be easy to cut away a defect airframe leading edge from the structural portion by just cutting the joint apart with a cutting tool (parallel with and along the contact area).

Suitably, the joint comprises plastic material.

In such way the joint can be made in a simple way. The joint can be used for both metal skins and/or CFRP and/or other plastic (cured resin comprising fiber reinforcement) skins. In case of applying a metal leading edge, the span wise and chord wise attachment to an intermediate section of plastic via a bolted design (bolts or other fastening elements), wherein the intermediate section being joined to the airfoil main skin via a scarf joint in span wise direction and a butt joint (or scarf joint) in chord wise direction.

Preferably, the plastic (or CFRP) being comprised of an adhesive and can easily be set with predetermined maximum joint strength in a cost effective manner. By adding different types of reinforcing fibres or in built failure of the plastic (or CFRP) joint, the maximum joint strength can be determined for achieving a break apart of the joint thereby converting the impact energy to the "break away energy" instead of affecting the structural portion, thereby achieving a safe flight and at the same time a low weight aircraft.

Preferably, the joint comprises an additional plastic layer being sanded (and/or polished as needed) for achieving a smooth aerodynamic surface also within the area of the joint.

In such way is achieved that the aerodynamic surface will provide a laminar air flow over the airframe and also over the joint.

Suitably, the airframe leading edge part is formed as a U-formed profile.

Thereby is achieved that the leading edge part can be used as a leading edge of a wing.

Preferably, the airframe leading edge part is formed as part of a wing, vertical and horizontal stabilizer or nose-cone.

In such way is achieved that the present solution can be used not only for wings, stabilizers, fins, nacelles, antenna housings, but also for nose cones. The aerial vehicle having such well-defined breaking zones or joints between airframe leading edge parts and structural portions (wing spars, spars, caps, ribs etc.) will be manufactured with less weight, which saves fuel.

Suitably, the structural portion comprises an outer skin, the edge of which is adapted to fit the longitudinal scarf joint edge.

Thereby a joint can be made in an optimal way between the airframe leading edge and the structural portion by using the thickness of the structural portion outer skin for achieving the maximum joint strength of the joint. A distance is provided between the breakable joint and outermost parts of the structural portion by means of the outer skin.

Preferably, both the longitudinal joint edges are adapted to break away from the structural portion.

Two joints thus being adapted to break apart in the eventual event of impact of an object deforming the airframe leading edge part during said use. In such way the impact force (especially in case of a symmetric impact) onto the airframe leading edge part will break the both joints apart, wherein the force partly has been absorbed and distributed to a break action, and partly being transferred to the structural portion. Each joint is adapted to break apart (peel and shear) in the event of a bird strike deforming the airframe leading edge part.

Suitably, the airframe leading edge butt joint or butt joint with join strap part further comprises a first and a second transverse (cord wise) joint edge butt joint or butt joint with join strap, each of which being adapted to fit a transverse (cord wise) joint edge butt joint or butt joint with join strap of an adjacent airframe leading edge part.

Preferably, the leading edge comprises a group of leading edge parts, each having span wise scarf joint edges and cord wise joint edge forming butt joint or butt joint with join strap edges. Each leading edge part being joined to another adjacent leading edge part via their cord wise joint edges butt joint or butt joint with join strap and being joined to the wing box via their span wise joint edges.

Alternatively, each leading edge part being joined to another adjacent leading edge part via bolted design and ribs in chordwise direction and/or span wise direction.

Suitably, the leading edge part is joined to a traditional leading edge section (such as a landing light module, nacelle section etc.) or to a wing root section or to a wing tip section.

Preferably, the group of leading edge parts comprises there between arranged structures of traditional type.

In such way there is achieved that the transverse joint edges also provides that at least two adjacent airframe leading edge parts may cover one common structural portion. Preferably, a transverse joint joining two adjacent transverse joint edges is adapted to break in the event of an eventual object strikes and deforms one of the airframe leading edge parts during said use. By arranging a plurality of airframe leading edge parts in line after each other in the longitudinal direction and a plurality of transverse joints being designed to break at beforehand determined maximum joint strength (PTmax) of the transverse joint. Also, wing ribs attached to the structural portion (or being parts thereof), will due to their elongation in the direction towards the impact force, strengthen the structural portion as well.

Preferably, one of the transverse joint edges has longer extension in the transverse direction than the other transverse joint edge of the same airframe leading edge portion.

In such way it is possible to achieve a line of airframe leading edge parts in the leading edge of an aircraft wing as the wing often narrows in the direction to the wing tip.

Suitably, the airframe leading edge parts are designed to fit a certain type of aircraft, and each airframe leading edge part exhibits an individual design for a certain position of the aircraft.

In such way is achieved that spare parts, in the form of airframe leading edge parts, can be stored at airports or at aircraft industry nearby for fast distribution to an aircraft which has collided with a bird. The damaged airframe leading edge part is removed by cutting (for example) it loose from (in some embodiments also heating the joint would bring the part free from the structural portion) the wing leading edge area. The removal can be done along the joint edge of the structural portion (or structural portion outer skin) so that a clean edge is provided. Thereafter the new airframe leading edge part is bonded in position, which position corresponds with the previous position of the damaged airframe leading edge part. The joint upper side is thereafter made even and smooth with the surrounding aerodynamic surface and also sanded for achieving a smooth aerodynamic surface within the area of the joint.

Preferably, the structural portion comprises a wing box, outer wing skins, spar ribs, stiffeners, etc.

In such way, all structural components of the structural portion will promote for keeping the structural portion intact against a bird impact pressing the airframe leading edge part in a direction towards the structural portion.

Suitably, the airframe leading edge part and the structural portion being made of plastic comprising reinforcing fibres.

In such way is achieved an aircraft article, such as a wing, fin etc., where the thermal expansion is similar for both the leading edge and the structural portion (especially outer skin), which provides that the joint strength can be determined with high degree of accuracy. At the same time, the article can be made of low weight.

In such way is achieved that a also leading edge part of metal can be attached to a wing box of composite.

This has also been achieved by a method.

In such way is provided a cost-effective method for service of aircraft at the same time as weight can be saved and the structural portion will be protected.

Preferably, the last step comprises sanding (and/or polished if needed) of the new joint after curing of the adhesive.

Thereby a smooth aerofynamic surface is achieved.

Suitably, the step of removing the damaged airframe leading edge part from the structural portion comprises separating the airframe leading edge part from the structural portion along the entire joint connecting the damaged airframe leading edge with the structural portion.

In such way is achieved that an airframe leading edge part, being hit by a bird, cost-effective can be removed and exchanged to a new leading edge part. The joint will per se indicate a cut-of-line and the damaged leading edge can be easily removed with a cutting tool following the joint. The breakable joint has in this example not been affected by the impact, but nevertheless a breakage could have occurred. However, after landing and inspection of the leading edge, only the deformation of the leading edge is detected. A decision can be made regarding repair or replacement.

Preferably, the step of removing the damaged part also includes the step of separating adjacent parts from each other.

Suitably, the new airframe leading edge part is a spare part earmarked for a specific position of the wing.

In such way time and costs are saved in case of an bird impact. The wing box will be saved from damage at the same time the leading edge part (which has been damaged) cost-effective can be replaced.

BRIEF DESCRIPTION OF THE DRAWINGS

The present invention will now be described by way of examples with references to the accompanying schematic drawings, of which:

FIG. 1 illustrates an aircraft comprising leading edges;

FIGS. 2a-2b illustrate prior art leading edge;

FIGS. 3a-3b illustrate a cross-sectional view of an airframe leading edge part according to a first embodiment;

FIGS. 8a-8f illustrate inter-connected sections of airframe leading edge parts;

DETAILED DESCRIPTION

Figure 4A:
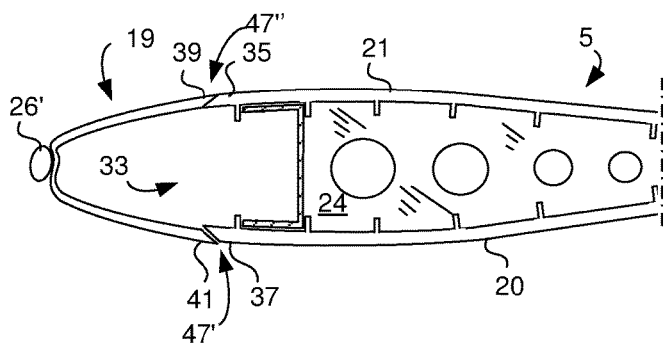
FIG. 4a illustrates a cross-sectional view of a leading edge according to a second embodiment.

Hereinafter, embodiments of the present invention will be described in detail with reference to the accompanying drawings, wherein for the sake of clarity and understanding of the invention some details of no importance are deleted.

FIG. 1 schematically illustrates an aircraft 1. The aircraft 1 comprises winglets 3, a wing 5, a stabilizer 7, a fin 9, a nose cone 11, an antenna 13, a radar radome 15, engine nacelles 17, each of which includes an airframe leading edge 19 facing the airstream when the aircraft 1 moves through the air. In the event of a bird strike on the airframe leading edge 19, the bird impact generates a force or forces onto the airframe leading edge 19 causing damage to the latter and also, in the worse case, to the structural part (such as a wing spar or upper 21 and lower wing skins of the wing).

An example of such damage is shown schematically in FIGS. 2a and 2b. A leading edge 22 according to prior art is fixedly mounted to a wing spar 23 and wing skins 24. In the case of a bird 26 impact on the airframe leading edge 22, shown schematically in FIG. 2b, the mass of the bird 26 causes a concentrated impact strike zone z and the forces generated by the impact being transferred to the wing spar 23 and wing skins 24, which will be damaged.

FIGS. 3a and 3b illustrate a cross-sectional view of an airframe leading edge part 19 comprising a leading edge skin 31 according to a first embodiment of the present invention. The airframe leading edge part 19 is formed as a U-formed profile and is designed to be replaceable (removable) fixed to an upper 35 and lower 37 wing skin edge of a wing skin 20, 21 (lower and upper skin), which during use moves through the air. The wing skins 20, 21 are parts of a structural portion 33 comprising a U-beam 32, wing ribs 18 and stringers 16, all of which parts are constituting a so called wing box 24 of the wing. The airframe leading edge part 19 comprises a first 39 and a second 41 longitudinal joint edge, each of which is adapted to fit the respective wing skin edge 35, 37. The respective fit is made by joining each longitudinal joint edge 39, 41 to said corresponding wing skin edge 35, 37 via an adhesive 45 forming a joint 47 between the wing skin edge 35, 37 and said longitudinal joint edge 39, 41. The adhesive 45 thus bonds the respective skin edge 35, 37 and joint edge 39, 41 of the leading edge part 19 together. The adhesive 45 of the joint 47 is adapted to break in the event of a bird strike 26 or in the event of another object hits the leading edge part 19. The bird strike 26 causes a deformation of the leading edge skin 31 of the airframe leading edge part 19. The impact also causes a breakage of the joints 47 between respective wing skin edge 35, 37 and corresponding joint edge 39, 41. The joints 47 are designed to break at beforehand determined maximum joint strength (Pmax) of the adhesive 45. In such way is achieved that in the event of a bird strike 26 on the airframe leading edge part 19, the bird impact deforms the airframe leading edge part's 19 leading edge skin 31, which also acts as a plastic deformation zone for protecting the upper 21 and lower 20 wing skins and wing spar 32 from damage. The forces of impact being transformed through the deformation zone z to the joint 47, and the epoxy adhesive 45 of the joint 47 breaks at the pre-determined maximum joint strength of the epoxy adhesive 45.

The wing skin edges 35, 37 and the joint edges 39, 41 are bevelled forming an inclined joining surface 36. The edges are bevelled in such way that imaginary inwardly extending prolongations (dashed and dotted lines)—, which extend from the edges, and which coincide with the respective inclined joining surface 36, —form an imaginary arrow (or angle), the point angle of which is pointing in a direction from the U-beam 32 and wing ribs 18, i.e. the structural portion 33.

FIG. 4a schematically illustrates a cross-sectional view of an airframe leading edge part 19 according to a second embodiment. Only one joint (the lower 47') is adapted to break in the event of foreign object 26' impact. The joint 47' is designed to break at a beforehand determined maximum joint strength (Pmax) of the joint's 47' adhesive 45 (bonding together the wing skin edge 37 and joint edge 41 during normal use of the airframe) for protecting the wing box 24 and other structural wing parts, such as lower 20 and upper 21 skins of the wing 5, from breakage in case of said impact. The upper joint 47" is firmly adhered to the structural portion's 33 upper wing skin edge 35 of the upper wing skin 21.

Figure 4B:
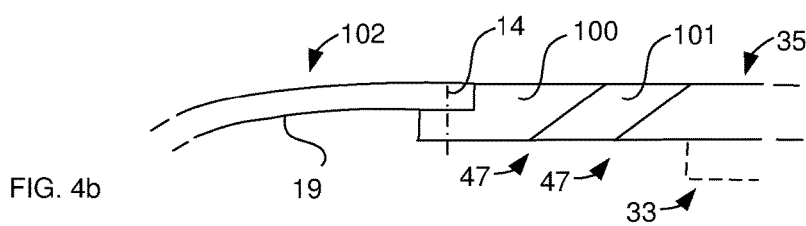
FIGS. 4b-4g illustrate different types of joints.

FIG. 4b schematically illustrates a portion of a leading edge part 19 mounted to a structural portion 33 including an upper composite skin 35. The leading edge part is made of metal and is bolted (bolts 14) to the skin 35. The area of the longitudinal joint edge comprises an outermost edge section 100 of composite being bonded to the major section of the skin 35 via an intermediate section 101 of composite. An acute point of the joint edge of the outermost edge section 100 coincides with the outer surface of the skin 35 and an obtuse point of the joint edge of the outermost edge section 100 is positioned in front of the acute point seen in a direction of flight. The scarf joints 47 (in double arrangement and parallel) permit secure functionality during use and also permit efficient repair.

Figure 4C:
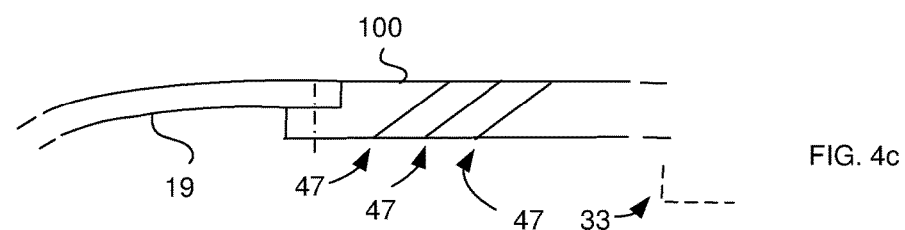

FIG. 4c schematically illustrates a portion of a leading edge part 19 mounted to a structural portion 33. In this embodiment the joint edges are joined via a multitude of scarf joints 47 for achieving flexibility in replacement of the outermost edge section 100 in case of impact.

Figure 4D:
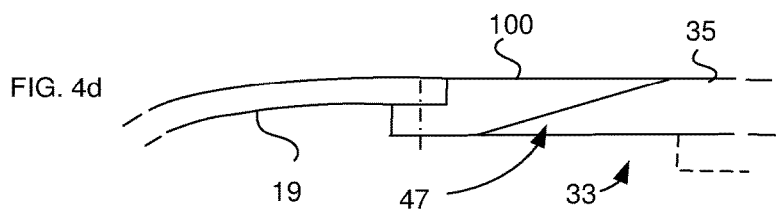

FIG. 4d schematically illustrates a portion of a leading edge part 19 mounted to a structural portion 33 according the a further embodiment with one single scarf joint 47 of the upper skin 35 between the outermost edge section 100 and the skin 35.

Figure 4E:
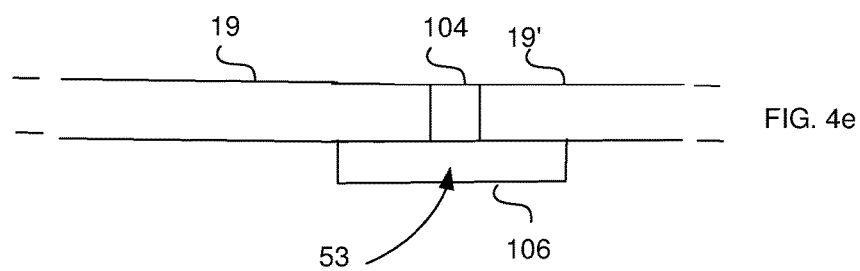

FIG. 4e schematically illustrates a portion of a leading edge part 19 mounted to an adjacent leading edge part 19' (as for such embodiment shown in FIG. 5b) via a butt joint 53 extending in chord wise direction. By a resin rich zone 104 designed to break at beforehand determined maximum joint strength, it will be possible to repair the leading edge by just replacing only one of the parts 19, 19' comprising the damaged area caused by the impact. The resin rich zone 104 also permits efficient repair cut out of the damaged part. The butt joint 53 is reinforced by a joint plate 106 bonded to the inner side of the skin.

Figure 4G:
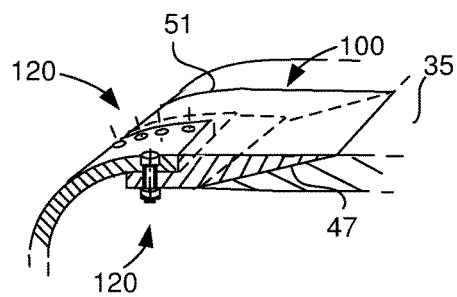
Figure 4F:
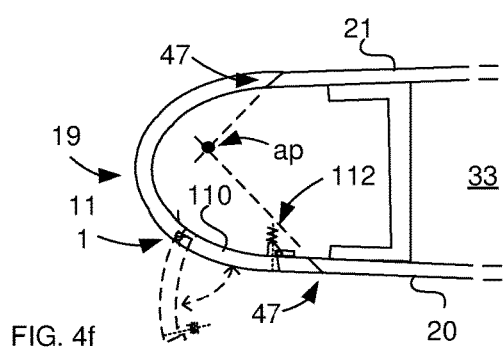

FIG. 4f schematically illustrates a leading edge of an aircraft. The leading edge comprises a leading edge part 19 made of CFRP. The leading edge part 19 is bonded to upper 21 and lower 20 skins made of CFRP of a wing box (defined as a structural portion 33 comprising a wing beam, said skins, stringers etc.) of the aircraft's wing. The bond is provided by upper and lower scarf joints 47, which inclined faces define an imaginary apex appointing in the direction of flight when the aircraft is used. An access door 110 is hingedly arranged about a hinge arrangement 111 and is lockable in closed position by means of a lock device 112.

The access door 110 is positioned on the lower side of the wing (pressure side) for efficient maintenance and inspection service.

FIG. 4g schematically illustrates a joint used for a metal leading edge joined to a wing box made of CFRP. The spanwise and chord wise attachment to an outermost section 100 of plastic via a bolted design (bolts 120 or other fastening elements), wherein the outermost section 100 being joined to the airfoil main skin 35 via a scarf joint 47 in span wise direction and a butt joint 51 (or scarf joint) in chord wise direction.

Figure 5A:
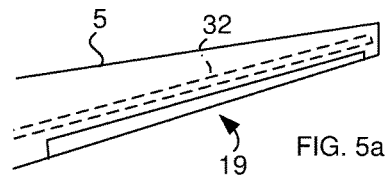
FIGS. 5a-5c illustrate further embodiments of airframe leading edges.

FIG. 5a schematically illustrates a wing 5 comprising an airframe leading edge part 19 being designed according to a third embodiment. The airframe leading edge part 19 is made in one piece for covering the wing's 5 edge facing the airflow.

Figure 5C:
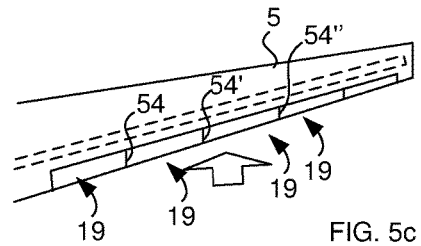
Figure 5B:
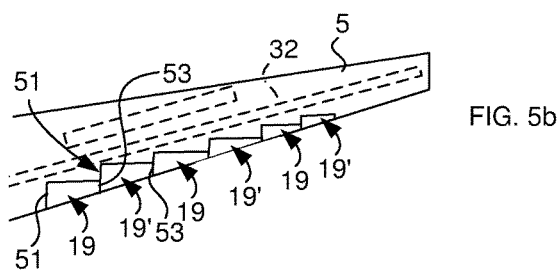

FIG. 5b schematically illustrates a wing 5 comprising an airframe leading edge being designed according to a fourth embodiment. The airframe leading edge comprises a plurality of airframe leading edge parts 19, each comprising a first 51 and a second 53 transverse joint edge. The first transverse joint edge 51 of one airframe leading edge part 19 is adapted to fit a second transverse joint edge 53 of an adjacent airframe leading edge part 19'. The transverse joint edge 51, positioned nearest the wing root, exhibits a longer extension in the transverse direction, than the other transverse joint edge 53 of the same airframe leading edge part 19.

In FIG. 5c being schematically illustrated a plurality of airframe leading edge parts 19 arranged in line after each other in a longitudinal direction along the wing's 5 airframe leading edge. Transverse joints 54, 54', 54" are designed to break at beforehand determined maximum joint strength (PTmax) of a transverse joint adhesive (not shown). The adhesive bonds the joints together under normal use of the leading edge parts 19. In such way is it possible to achieve a line of airframe leading edge parts 19 of the leading edge of an aircraft wing 5 as the wing 5 commonly narrows in the direction to the wing tip.

Figure 6:
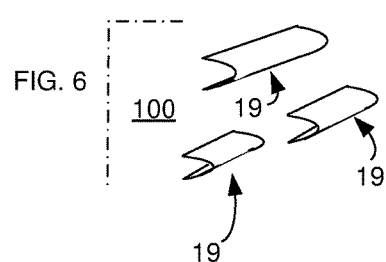
FIG. 6 shows a leading edge part storage room of an airport.

In FIG. 6 is shown a leading edge part store 100 of an airport (not shown) comprising a set of airframe leading edge parts 19. The airframe leading edge parts 19 are designed to fit a certain type of aircraft, and each airframe leading edge part 19 comprises an individual design for a certain position of the aircraft and comprises an ID-marking (not shown). The actual damaged airframe leading edge part 19 is removed from the damaged wing leading edge by cutting the actual airframe leading edge part 19 along its joint edges. Thereafter, a new airframe leading edge part 19 having corresponding ID-marking being mounted and adhered to the wing skin edges (not shown, but designated with reference 35, 37 in some of previous figures), replacing the damaged part. The joint 47 is thereafter finished and is made smooth for achieving an efficient aerodynamic surface.

Figure 7:
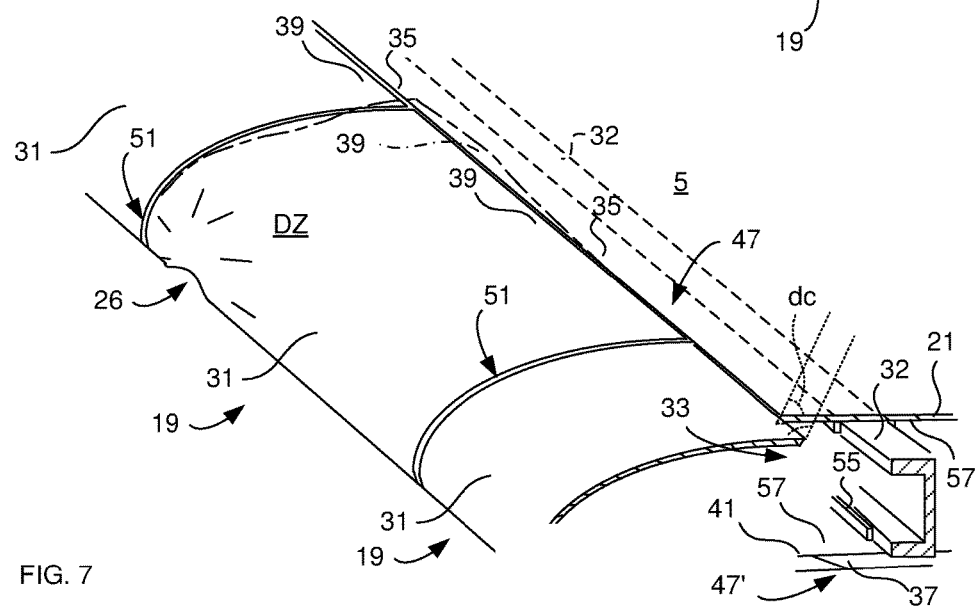
FIG. 7 illustrates in a perspective view an airframe leading edge comprising a plurality of leading edge parts.

FIG. 7 schematically illustrates in a perspective view, and in cross-section, and more in detail, an airframe leading edge comprising a plurality of leading edge parts 19 of a wing's 5 leading edge. A wing spar 32 is fixedly adhered to upper 21 and lower 20 wing skins. Pairs of spar caps 55 are adhered to inner surfaces 57 of the wing 5 skins 20, 21. An upper joint 47 between the upper wing skin edge 35 and a first (upper) longitudinal joint edge 39 of the airframe leading edge part 19 is formed as an inclined scarf. By determining the declination of the inclined scarf properly, the ratio between the overlap of the upper joint 47 and the thickness of the airframe leading edge skin 31 within the area of the longitudinal joint edge 39 is such that a predetermined maximum joint strength of the upper joint 47 is reached. The angle of declination dc is in this embodiment 45 degrees relative the extension of the wing 5 skin 21. This is made in addition to beforehand determination of the strength properties of the epoxy adhesive (not shown) of the joint 47 material. The airframe leading edge part 19 thus comprises a first 39 and second 41 longitudinal joint edge, each of which is adapted to fit the respective wing skin edge 35, 37. The upper joint 47 is achieved by said adhesive, which is set with a beforehand and predetermined strength to tear apart due to peel stresses generated by an eventual impact 26 and due to the fact that shear strains exceed the strength limits for the epoxy adhesive. The upper joint 47 is set with stress parameters such as tension stress, peel stress etc. for determining the maximum joint strength of the upper joint 47. As shown in FIG. 7, the upper joint 47 has been loaded due to the impact 26. A deformation of the leading edge skin 31 is due initially and impact forces have been absorbed by the skin 31. The epoxy adhesive of the upper joint 47 is elastic or exhibits non-elastic behaviour, and on further loading the epoxy adhesive is stressed beyond its yield point in shear and the upper joint 47 will break apart as shown in FIG. 7 with broken line. The upper joint 47 is thus designed to break apart when said impact 26 force is so high that—, even though said plastic deformation of the airframe leading edge part 19 has absorbed some of the impact 26 energy, —the maximum joint strength (Pmax) of the upper joint 47 is reached. Thereby is achieved that the structural portion 33 (wing spar 32, spar caps 55, wing skins 20, 21) positioned behind the airframe leading edge part 19 (seen in a flight direction forward) will be protected in the event of bird impact or taxi into hangar door (not shown). By a deformation zone DZ of the airframe leading edge part 19 skin 31 and the set predetermined strength of the breakable upper joint 47, the airframe leading edge part 19 will take up and convert impact 26 forces affecting the skin 31 of the airframe leading edge part 19, thus protecting the structural portion 33. The impact 26 energy will also be transferred into a breakaway force breaking away the airframe leading edge part 19 along a portion of the upper joint 47. This is safe and the structural portion 33 can be kept intact and its structural properties are not affected. By providing only one of the joints 47 with said determined maximum joint strength (Pmax) and the other (lower joint 47') with a higher strength, the airframe leading edge 19 still can be positioned in front of the structural portion 33 and resilient spring back to the position covering the structural portion 33, thereby not affecting the air stream so much. The upper joint 47 comprises a scarf joint surface, whereby it will be easy to cut away a defect airframe leading edge part 19 from the wing skin 20, 21 by cutting the joints (47, 47', 51) apart with a cutting tool (not shown).

FIGS. 8a-8f schematically illustrate an embodiment where sections of the airframe leading edge part 19 are connected to each other, via breakable transverse joints 51. A wing 5 comprises sections of leading edge parts 19. During use, the airflow meets the leading edge 2 of the wing 5. An unidentified object 26 accidently hits one of the sections 19. The impact resultant force F can be divided into X-force and Y-force. The X-force loads the transverse joint 51 (or a butt joint or a butt joint together with a joint strap), which is shown in FIGS. 8b and 8c. Cross-section A-A of FIG. 8b is shown in FIG. 8c and the transverse joint 51 is formed with an inclined overlap 61, which promotes the "breakaway" property of the joint 51 as is shown in FIG. 8d wherein skins 31 are separated from each other along joint 51 due to breakage of adhesive 45. Furthermore, also the Y-force loads an upper longitudinal joint 39 in a way such that the upper joint 39 breaks apart in case of bird impact. This is shown in section B-B of FIG. 8e and closer in detail in FIG. 8f is shown a cross-section of B-B. A wing spar 32 is shown in FIG. 8e with broken lines. The respective wing skin 20, 21 protrudes from the structural portion 33 so that a static or dynamic distance ds is achieved measured from the wing spar 32 outermost portion to the joint edge 39, 41 of the leading edge part 19. The upper and lower skin edges 35, 37 of the wing skins 20, 21 join the airframe leading edge part's 19 joint edges 39, 41. The joint 47 is designed to tear apart due to peel stresses generated by a certain impact 26 and specific impact forces IF, and due to the fact that shear strains exceed the strength limits for the plastic adhesive 45.

Figure 9:
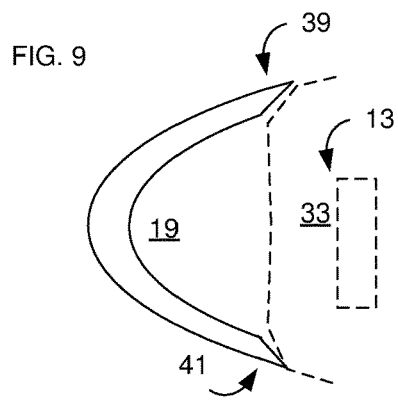
FIGS. 9-10 illustrate a further embodiment of an airframe leading edge part.
Figure 10:
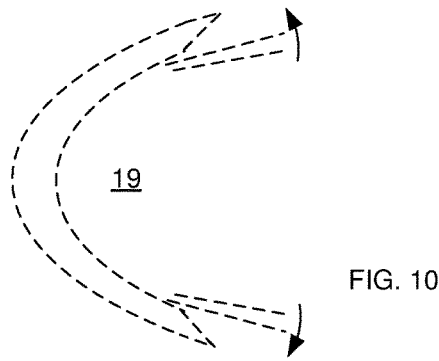

FIG. 9 schematically illustrates an embodiment of an airframe leading edge part 19, which exhibits a flexing property for achieving a spring effect forcing the first 39 and second 41 longitudinal joint edge of the airframe leading edge part 19 away from the structural portion 33, in this case a VOR antenna 13 encapsulated in a resin housing (not shown). In FIG. 10 is shown the airframe leading edge part 19 of the antenna 13 in a spring-out state. The thickness of the leading edge part 19 is such that it is thicker at the section first meeting the air stream and thinner at the sections meeting the first 39 and second 41 longitudinal joint edges. An eventual impact would thereby influence the leading edge part 19 in such way that the thicker portion takes up the impact force and protects the structural portion at the same time as the thinner section improves the break and spring out of the first 39 and second 41 longitudinal joint edges.

Figure 11A:
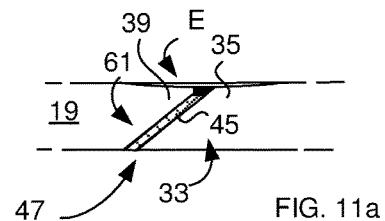
FIGS. 11a-11c illustrate joints each exhibiting a plane and smooth joint overlap.

FIG. 11a schematically illustrates a joint 47 having a plane joint overlap surface and epoxy is used as adhesive 45 bonding the joint edges 35, 39 together. Thereby it will be easy to cut away a defect airframe leading edge part 19 from a structural portion 33 by just cutting the joint 47 apart with a cutting tool (not shown) along the joint 47. The cutting thus follows the overlap 61. The structural portion 33 skin is made of composite. The epoxy of the adhesive 45 is set with predetermined maximum joint strength. An in-built failure of the epoxy of the adhesive 45 is made for determination of the maximum joint strength for achieving a break apart of the joint 47 joining the composite structural portion 33 and the leading edge part 19, thereby converting the impact energy to "break away leading edge 19" energy, instead of affecting the structural portion 33 of aluminium Al. An additional plastic layer of epoxy E is applied for filling out the joint 47 and making a smooth joint. In such way is achieved that the aerodynamic surface will provide a laminar air flow over the joint 47.

Figure 11B:
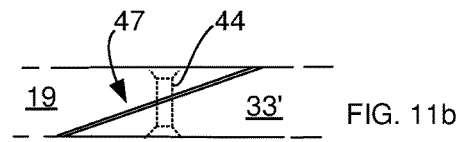

FIG. 11b schematically illustrates a joint 47 between a leading edge 19 of metal and a composite wing box 33'.

Figure 11C:
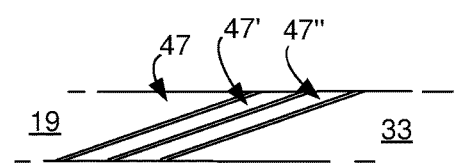

FIG. 11c schematically shows a further embodiment where the joint 47 has been completed with further in parallel extending scarf joints 47', 47". In case of impact at least one of them will break.

Figure 12A:
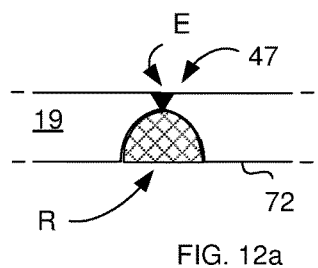
FIG. 12a-12d illustrate joints according to further embodiments of the leading edge part.

FIG. 12a schematically illustrates a joint 47 according to a further embodiment. In this case the overlap is replaced by interior arc shaped scarf walls coupled via a reinforced resin R. The reinforcement is made by means of carbon fibers. A triangular shaped surface cavity is filled with epoxy E for achieving a smooth surface. The reinforced resin is set with predetermined maximum joint strength for protection of the structural portion, here the skin 72 of a fin.

Figure 12B:
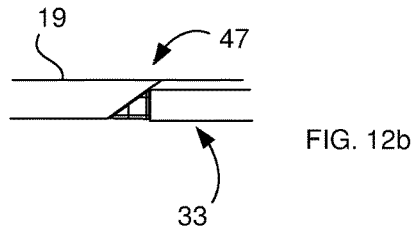

FIG. 12b shows an example of joint 47 where the structural portion exhibits an orthogonally straight cut meeting the joint edge of the airframe leading edge part 19 such that the latter can slide over the straight cut of the structural portion 33 in the event of impact.

Figure 12C:
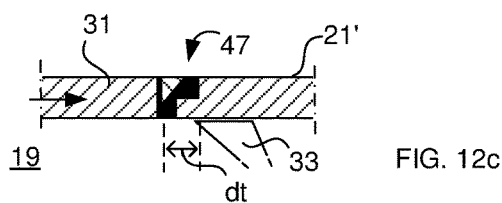

FIG. 12c illustrates an example of a joint 47 positioned at a distance dt (seen in a direction towards the flight direction) from the structural portion 33. The skin 21' of the structural portion 33 is step formed and a triangular needle is positioned within the joint 47 for promoting the breakage of the joint 47 in case of a very hard impact. In case of an impact, such as hail stone impact, of less weight, the airframe leading edge part 19 skin 31 will just deform without breakage of the joint 47.

Figure 12D:
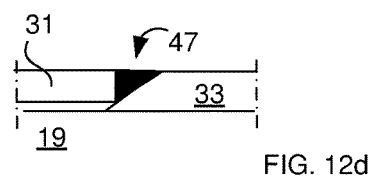

FIG. 12d illustrates an example of a joint 47 including a cut edge of the leading edge 19 which will slide over the structural portion 33 in case of heavy bird impact or eventual obstacle collision during taxi. A less heavy impact will just imply that the skin 31 of the leading edge part 19 will deform in accordance with a deformation zone (not shown) of the leading edge skin 31, but the joint 47 is set to break if the impact exhibits higher loads.

Figure 13A:
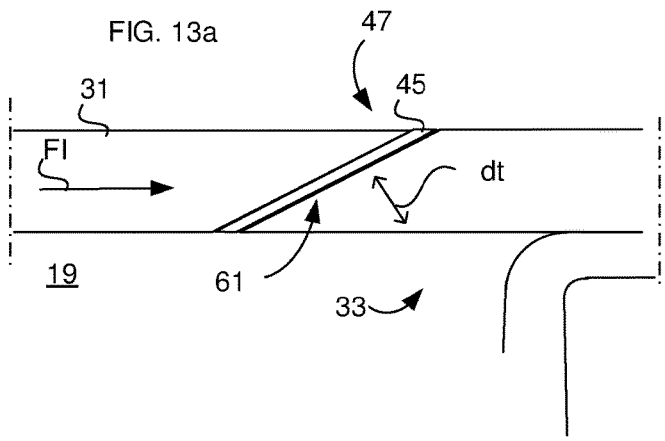
FIGS. 13a-13c illustrate shearing forces affecting a joint.
Figure 13B:
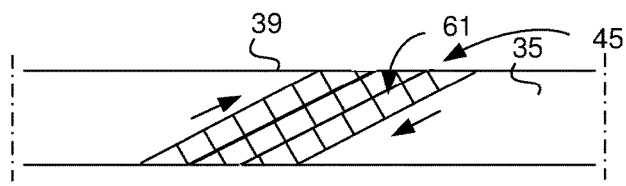
Figure 13C:
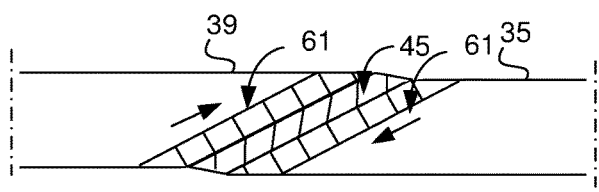

FIGS. 13a-13c schematically illustrate shearing forces affecting a joint 47 in case of a bird impact. The joint's 47 maximum joint strength is suitably determined in regard to the overlap 61 length of the joint 47, the thickness of the skin 31 of the airframe leading edge 19. In FIG. 13a is shown that a structural portion 33 is positioned a distance dt from the joint 47 for achieving a protective feature protecting the structural portion 33 against the force F of an eventual impact. An eventual bird strike generates a deformation of the leading edge 19 and the force FI generated by the impact 26 will tear apart the joint 47 due to peel stresses. The shear strains thus exceed the strength limits for the epoxy adhesive 45. The joint 47 in FIG. 13a comprises stress parameters, such as tension stress, peel stress etc., all determining the maximum joint strength of the joint 47. In FIGS. 13b and 13c being illustrated schematically the way the joint 47 will be loaded because of the impact. Initially, as the epoxy adhesive 45 is elastic (see FIG. 13c), the joint edge 39 and wing skin edge 35 will be displaced relative each other in a direction parallel with the extension of the plane joint surface overlap 61 section. On further loading the epoxy adhesive 45 will be stressed beyond its yield point in shear and the joint will break apart (not shown in FIG. 13c but could be similar to the example of breakage of joint 47 in FIG. 8f).

Figure 14A:
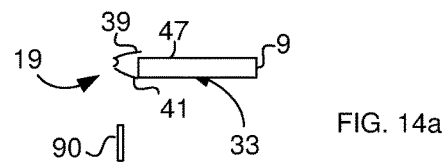
FIGS. 14a-14d illustrate method steps of repairing a leading edge by cost-effective replacement of the latter.
Figure 14B:
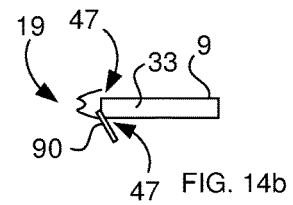
Figure 14C:
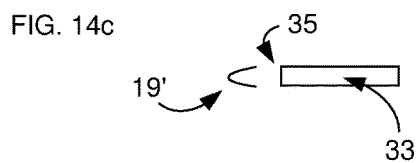
Figure 14D:
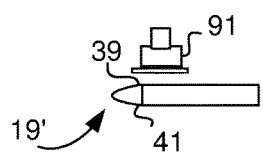

FIGS. 14a-14d schematically illustrate steps of a method of repairing an aircraft's (not shown) airframe leading edge part 19 of a fin 9. A leading edge comprises two adjacent airframe leading edge parts (only one 19 of which is shown). The airframe leading edge part 19 includes a first and a second longitudinal joint edge 39, 41. The edges 39, 41 are adapted to fit a structural portion 33 of the fin 9 via two joints 47. The aircraft has landed. The fin leading edge 19 has been hit by a bird. A plastic deformation of the leading edge 19 is a fact. Also, one of the joints 47 has teared apart. In FIG. 14a is schematically shown how a cutting tool 90 is set to cut the still intact joints 47 apart. In FIG. 14b the damaged airframe leading edge part is removed from the structural portion 33. Removal of the damaged airframe leading edge part 19 from the structural portion 33 is made and separating of the airframe leading edge part 19 from the structural portion 33 is made along an entire unbroken joint 47 connecting the damaged airframe leading edge 19 with the structural portion 33. This is followed by that the joint edge surface of the structural portion is checked. Detection of remaining joint adhesive will result in machining of the surface to be even. Thus, finishing of the overlap section (not shown) is made. Joint edges 35 of the structural portion 33 are thus provided to correspond with the joint edges 39, 41 of the new airframe leading edge part 19' replacing the damaged leading edge part 19. Prior to mounting of the new leading edge part 19' to the structural portion 33, an epoxy adhesive (not shown) is applied to either or both joint edge surfaces. In FIG. 14c is shown the positioning of the new airframe leading edge part 19' to the structural portion 33 in place of the damaged airframe leading edge part 19. When the epoxy adhesive has cured, areas of the joint 47 being exposed in the aerodynamic surface of the fin 9 airframe will be sanded (could be polished if needed) by means of a sanding apparatus 91 (see FIG. 14d), or in some cases, if needed, also machined before sanding.

Figure 15:
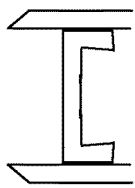
FIG. 15 illustrate the FIG. 13a embodiment where wing the U-beam of the wing box comprises flanges protruding backward seen in flight direction.

FIG. 15 schematically illustrates the FIG. 13a embodiment where the wing box U-beam comprises flanges protruding backwards seen in the flight direction.

Figure 16:
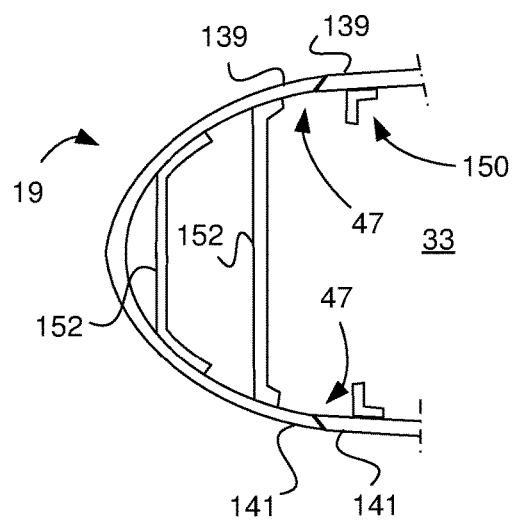
FIG. 16 illustrates an example of a further leading edge structure.

FIG. 16 illustrates an example of a further leading edge part 19. In this embodiment the span wise joints 47 are arranged parallel with the prolongation of a front spar 150 of the wingbox 33. The leading edge part 19 part comprises two internal spars 152. The joint edges 139, 141 of both the leading edge part 19 and the wing box 33 are arranged at a distance (seen in the direction of the skin extension) from the front spar 150. The front spar 150 is defined as the almost outer spar of upper and lower skin respectively (in the direction of flight) extending in spanwise direction and being attached to the skin underside. Each front spar 150 is a structural component of the wingbox 33. By said distance it will be cost-effective to remove a damaged leading edge as a cutting tool will have free access and skin material is left between the structural wingbox and the joint.

Figure 17A:
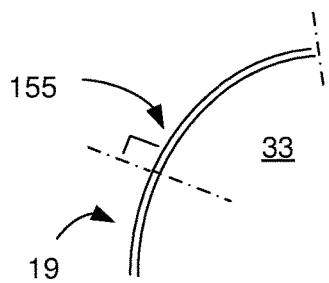
FIGS. 17a-17d illustrate examples of angles of joints where the joining surface defines an obtuse or acute angle with the skin outer surface.
Figure 17B:
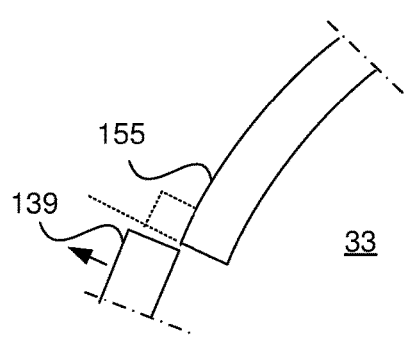
Figure 17C:
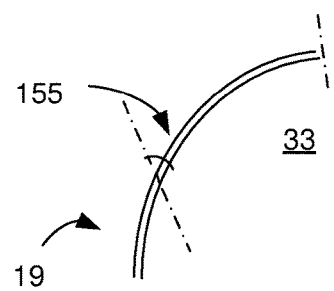
Figure 17D:
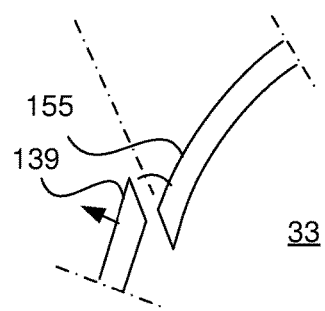

FIGS. 17a-17d schematically illustrate examples of angles of joints where the joining surface defines an obtuse or acute angle with the skin outer surface. FIG. 17a shows an angle of about 90 degress (butt joint) between joint surface and skin extension in an area adjacent the joint. FIG. 17b shows a closer view of the butt joint in FIG. 17a where an impact affects the leading edge joint edge 139 to move in a direction from the skin outer surface 155 of the main airfoil (wing box) as being the cases regarding the other embodiments. FIG. 17c shows an angle where the angle is acute (angle between scarf joint surface and the plane of the skin extension in an area adjacent the scarf joint). In this case the bond is provided by upper and lower scarf joints (upper is shown), which inclined faces define an imaginary apex pointing in counter direction of flight when the aircraft is used. FIG. 17d shows a closer view of the scarf joint in FIG. 17c where an impact affects the leading edge joint edge 139 to move in a direction from the skin outer surface 155 of the main airfoil structure 33.

The present invention is of course not in any way restricted to the preferred embodiments described above, but many possibilities to modifications, or combinations of the described embodiments, thereof should be apparent to a person with ordinary skill in the art without departing from the basic idea of the invention as being defined in the appended claims. It is possible the skin materials could be metal, CFRP, plastic, epoxy, ceramic or combinations thereof. The adhesive could comprise fibres or could be of any kind of adhesive or resin with or without reinforcing fibres, just providing that the joint is designed to break at beforehand determined maximum joint strength (Pmax). The present invention is applicable both on an integrated leading edge made of glass carbon kevlar or other similar fibre materials and a matrix as well as a combination of a metal leading edge and a wing box made of CFRP or similar matrix. The wing skin edges and the joint edges are bevelled forming an inclined joining surface. The joining surface can together with the skin outer surface define an obtuse angle or an acute angle. The edges are bevelled in such way that imaginary inwardly extending prolongations form an imaginary arrow (or angle), the point angle of which is pointing in a direction from the U-beam and wing ribs i.e. the structural portion. This means that the wing box skin, within the joining surface area, tapers in direction towards the leading edge skin, which within the joining surface area tapers in a direction towards the wing box skin. The acute point of the joint edge of the leading edge skin coincides with the outer surface of the wing skin and the obtuse point of the joint edge of the leading edge skin is positioned in front of said acute point seen in a direction of flight. The joint is preferably made of an adhesive electrically isolated or electrically conductive. It could also be made of a resin rich layer. For clarification only; the impact resultant force F is divided into X-force and Y-force. The X-force loads the transverse joint or a butt joint or a butt joint together with a joint strap or other type of joint. The type of joint can be of different kinds for all positions. It can be a scarf joint, a butt joint or a butt joint with a joint strap. Composite is defined as a cured resin comprising fiber reinforcement.

The scarf joint bevelled joining surfaces may have an angle relative the extension of the skin of 3-90 degrees (preferably 10-80 degrees) depending upon where the joint is positioned and upon the geometry of the leading edge.

The thickness of the skin could be between 1 mm up to 30-40 mm. The length of the scarf joint seen in chord direction could be 1-10 times, preferably 3-7 times, longer than the thickness of the skin.

The invention claimed is:

1. An airframe leading edge part designed to be replaceable fixed to a structural portion which during use moves through the air, the airframe leading edge part comprising:
    a first longitudinal joint edge and a second longitudinal joint edge adapted to fit the structural portion;
    at least one joint between the structural portion and at least one of the longitudinal joint edges, wherein the joint comprises adhesive;
    the joint being configured to break in the event of an eventual object strikes and deforms the airframe leading edge part during said use,
    the airframe leading edge part being configured to transfer impact energy into a breakaway force, to break away the airframe leading edge part from the structural portion in order to protect the structural portion; and
    the joint being designed to break at beforehand determined maximum joint strength of the joint,
    whereby the joint is designed to break apart when an impact force is so high that, even though deformation of the airframe leading edge part has occurred due to absorption of the impact energy, the maximum joint strength of the joint is reached span wise.

2. The airframe leading edge part according to claim 1, wherein a further joint oriented in chordwise direction is designed to break at a joint strength higher than said maximum joint strength.

3. The airframe leading edge part according to claim 1, wherein the joint is an inclined scarf joint, a butt joint, or a butt strap joint.

4. The airframe leading edge part according to claim 1, wherein the joint comprises a resin rich zone.

5. The airframe leading edge part according to claim 1, wherein the joint comprises electrically conductive adhesive or electrically isolating adhesive.

6. The airframe leading edge part according to claim 1, wherein the joint comprises an additional plastic layer being sanded for achieving a smooth aerodynamic surface also within the area of the joint.

7. The airframe leading edge part according to claim 1, wherein the airframe leading edge part is one of a plurality of parts joined together via cord wise joints, wherein the parts are made of metal and the structural portion being made of plastic.

8. The airframe leading edge part according to claim 1, wherein the structural portion comprises an outer skin, the edge of which is adapted to fit the longitudinal joint edge.

9. The airframe leading edge part according to claim 8, wherein the structural portion is a wing box.

10. The airframe leading edge part according to claim 1, wherein both the longitudinal joint edges are adapted to break away from the structural portion.

11. The airframe leading edge part according to further comprising:
    a first transverse joint edge and a second transverse joint edge adapted to fit a transverse joint edge of an adjacent airframe leading edge part.

12. The airframe leading edge part according to claim 11, wherein one of the transverse joint edges has longer extension in the transverse direction than another transverse joint edge.

13. The airframe leading edge part according to claim 11, wherein the airframe leading edge parts are designed to fit a certain type of aircraft, and each airframe leading edge part has an individual design for a certain position of the aircraft.

14. The airframe leading edge part according to claim 1, wherein the structural portion comprises a wing box and/or an outer wing skin and/or spar cap and/or stiffener, and a thickness of the leading edge part is such that the leading edge part is thicker at a section first meeting the air stream than other sections.

15. The airframe leading edge part according to claim 1, wherein the airframe leading edge part and the structural portion are made of plastic comprising reinforcing fibres.

16. The airframe leading edge part according to claim 1, wherein the joint indicates a cut-off-line between the airframe leading edge part and the structural portion.

\* \* \* \* \*